United States Patent [19]

Lecheheb et al.

[11] Patent Number: 4,864,323
[45] Date of Patent: Sep. 5, 1989

[54] CONTINUOUS INK JET PRINTING

[75] Inventors: Ammar Lecheheb, Newmarket; James J. Doyle, Histon, both of England

[73] Assignee: Domino Printing Sciences PLC, Cambridge, England

[21] Appl. No.: 180,460

[22] Filed: Apr. 12, 1988

[30] Foreign Application Priority Data

Apr. 14, 1987 [GB] United Kingdom ............... 8708885

[51] Int. Cl.$^4$ ............................................. G01D 18/00
[52] U.S. Cl. ........................................... 346/1.1; 346/75
[58] Field of Search .................................. 346/1.1, 75

[56] References Cited

U.S. PATENT DOCUMENTS

| 4,393,385 | 7/1983 | Tinnai et al. | 346/75 |
| 4,631,549 | 12/1986 | Braun et al. | 346/1.1 |
| 4,638,325 | 1/1987 | Schneider et al. | 346/1.1 |

Primary Examiner—Clifford C. Shaw
Assistant Examiner—Gerald E. Preston
Attorney, Agent, or Firm—Robbins & Laramie

[57] ABSTRACT

A method of operating a continuous ink jet printing system which includes a nozzle arranged to be vibrated by a piezoelectric oscillator. The nozzle, in use, passes a stream of ink past a charging electrode. The continuity of charge detection is sensed by a charge detector disposed immediately downstream of the charging electrode. The amplitude of the stimulation voltage applied to the piezoelectric oscillator is set sufficiently low such that the level of charge detected by the charge detector is below a threshold value. The amplitude of the stimulation voltage is then increased in discrete steps until the charge detector detects intermittent and proper droplet charging. The amplitude of the stimulation voltage is then further increased from its level at the end of the second step by a predetermined amount.

4 Claims, 4 Drawing Sheets

CONTINUOUS INK JET PRINTING

The present invention relates to a continuous ink jet printing system and in particular to a method by means of which the continuous stream of ink issuing from the nozzle is automatically broken up into droplets of uniform size, speed and spacing.

In a continuous ink jet printing system ink is passed from a reservoir to a print head under pressure, the ink being forced through a nozzle and broken up into droplets which are charged according to the desired print position, the charged droplets then being deflected on to the target by an electrostatic field. In such methods it is a prerequisite condition for proper droplet charging to occur that the stream not only breaks off well inside the charging tunnel, but that it is devoid of slow or intermediate satellite droplets. The continuous stream is broken up by vibrating the nozzle ultrasonically at high frequency.

It is known to set the stimulation voltage of the piezoelectric oscillator which vibrates the nozzle so that the break-off point of the droplets is situated within the charging electrode and so that it is devoid of satellites. However, this has always been achieved by the use of a microscope and a strobe in order to view the break-off point of the stream. This requires that the whole process be carried out by a trained technician and is both expensive and time consuming. There is thus a need for a continuous ink jet printing system in which the optimum stream break-off point is automatically determined and set. This can not only save expenditure of time and money, but may also provide a more reliable and consistent method of setting and adjusting the printer without the need for human intervention. The method will need to take into account the changes in environmental and operating conditions.

According to the present invention a method of operating a continuous ink jet printing system which includes a nozzle arranged to be vibrated by a piezoelectric oscillator, the nozzle, in use, passing a stream of ink past a charging electrode, comprises the steps of:

sensing the continuity of charge detection by means of a charge detector disposed immediately downstream of the charge electrode;

firstly, setting the amplitude of the stimulation voltage applied to the piezoelectric oscillator sufficiently low that the level of charge detected by the charge detector is below a threshold value;

secondly, increasing the amplitude of the stimulation voltage in discrete steps until the charge detector detects intermittent and proper droplet charging; and, thereafter increasing the amplitude of the stimulation voltage from its level at the end of the immediately preceeding step by a predetermined amount.

Utilizing the charge detector in this way enables the position of break-off to be controlled very accurately. When the charge detector continuously detects the presence of charge then this is indicative of the break-off point of the droplets occuring below the charging detector. Increasing the amplitude in small steps until intermittent and proper droplet charging is detected ensures that as soon as the break-off point is just inside the bottom of the charging electrode, but not well inside it, a level of stimulation voltage can be determined for subsequent increase by an experimentally predetermined value in order to take the break-off point to a precise position within the charging electrode.

Preferably, to guard against blockage of the nozzle, contamination of the charging electrode with ink or inefficiency of the oscillator, machine shutdown will be effected whenever the minimum stimulation voltage necessary for taking the stream break-off point into the charging electrode exceeds a second predetermined value. This value may be found empirically and may indicate either that the piezoelectric oscillator is inefficient or that there is too much ultrasonic energy damping or that the nozzle is partially or completely blocked or that the ink system pressure is too high or too low. In any of these cases, shutdown of the system is desirable.

Furthermore, and also to ensure that a proper print window exists, the stimulation voltage amplitude may be increased up to a third predetermined or maximum level (again found experimentally) and the charge detector monitored to determine whether or not proper droplet charging is being detected throughout the test. This third predetermined voltage may be set at a level which provides maximum power to the jet stream before the break-off point comes out of the top of the charging electrode or before satellites are created and the proper charging is disturbed thereby. During the time in which the stimulation voltage amplitude is increased to this third predetermined level any incorrect charging less than the threshold value detected by the charge detector can be set to cause shutdown of the machine.

A further check may be provided in order to ensure that the nozzle is operating with a sufficiently wide pressure window. The system pressure may be arranged to be increased by a predetermined amount and the method of the invention carried out again. If all the tests are passed then the pressure may be reduced to its original value and the stimulation amplitude then set to the value as determined in the final stage of the method.

One example of a method according to the present invention will now be described with reference to the accompanying drawings, in which.

Figure 1:
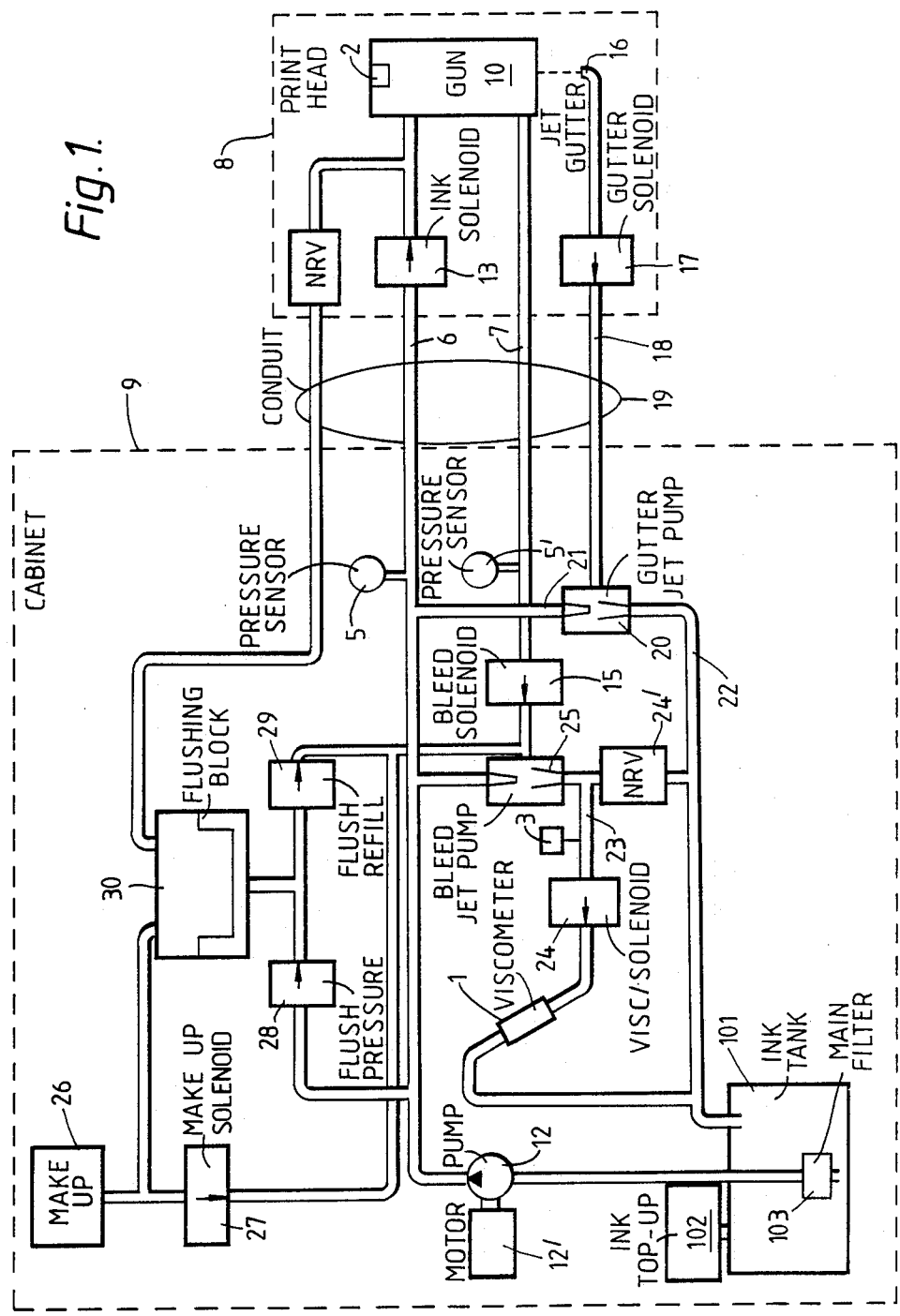
FIG. 1 is a block diagram of the ink system in a continuous ink jet printing apparatus; and, FIG. 2 is a block diagram of the electronic control system of the apparatus.

Ink is supplied from a main reservoir or ink tank 101 to which top-up ink is fed when necessary for replenishment, by a replaceable ink cartridge 102, and is fed through a filter 103 by means of a gear pump 12 driven by stepper motor 12'. From the pump 12 ink is fed through a supply line 6, which passes through a conduit 19 from the cabinet 9 to the print head 8, via an ink solenoid 13 to the ink gun or nozzle 10, from which ink is ejected in use. Ink droplets which are not printed are returned through a gutter/catcher 16 and, via a gutter solenoid 17, through a return line 18 (also in the conduit 19). The flow of ink in the return line 18 is caused, in this example, by a jet pump 20, the return flow constituting the secondary flow of the jet pump, and the primary flow in the jet pump being provided by a by-pass flow of pressurised ink from the supply line 6 through a by-pass line 21. Ink is returned form the jet pump 20 to the tank 101 through a line 22.

The viscometer 1 is located in a branch 23 off the line 22 so that viscosity measurements can be made of ink circulating in the system. A viscometer solenoid 24 controls flow through a non-return valve 24′ and through the solenoid as described in EP-A-0142265 or EP-A-0228828. Further explanation of the operation of the viscometer is not considered to be necessary in the context of this invention.

A bleed solenoid 15 is provided in a bleed line 7 from the print head 8 in order to accomplish, primarily, bleeding of ink from the print head on start and shutdown of the apparatus. As with the return line 18, the motive force for the bled ink is provided by a bleed jet pump 25.

An ink solvent make-up cartridge 26 is used to supply solvent as required to maintain the desired viscosity, the solvent being supplied through solenoid 27. The ink system can be flushed through with solvent by means of operation of solenoid 27 and further solenoids 28 and 29, in conjunction with flushing block. The operation of these items forms no part of the present invention and will not therefore be further described.

Figure 2:
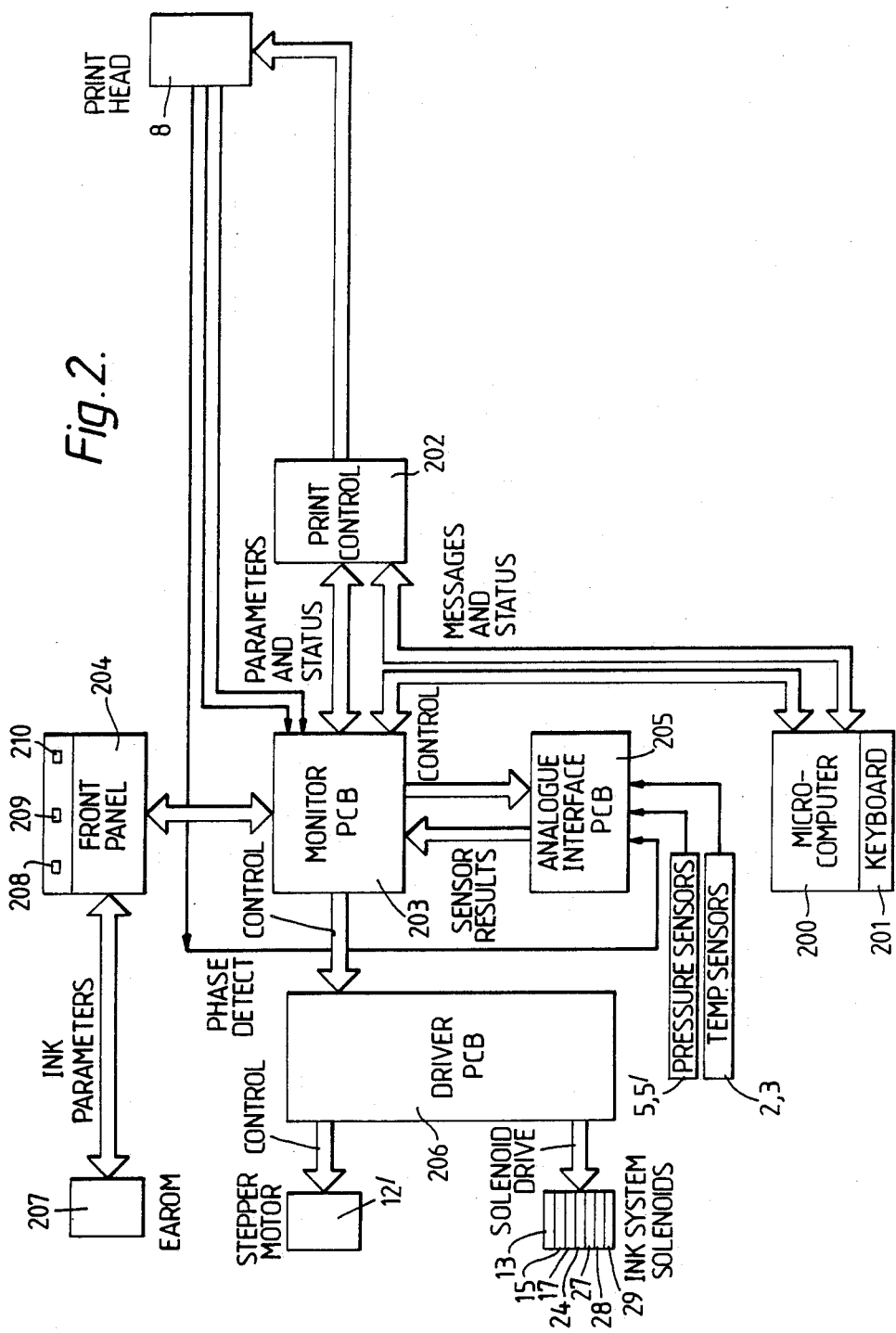
Figure 3:
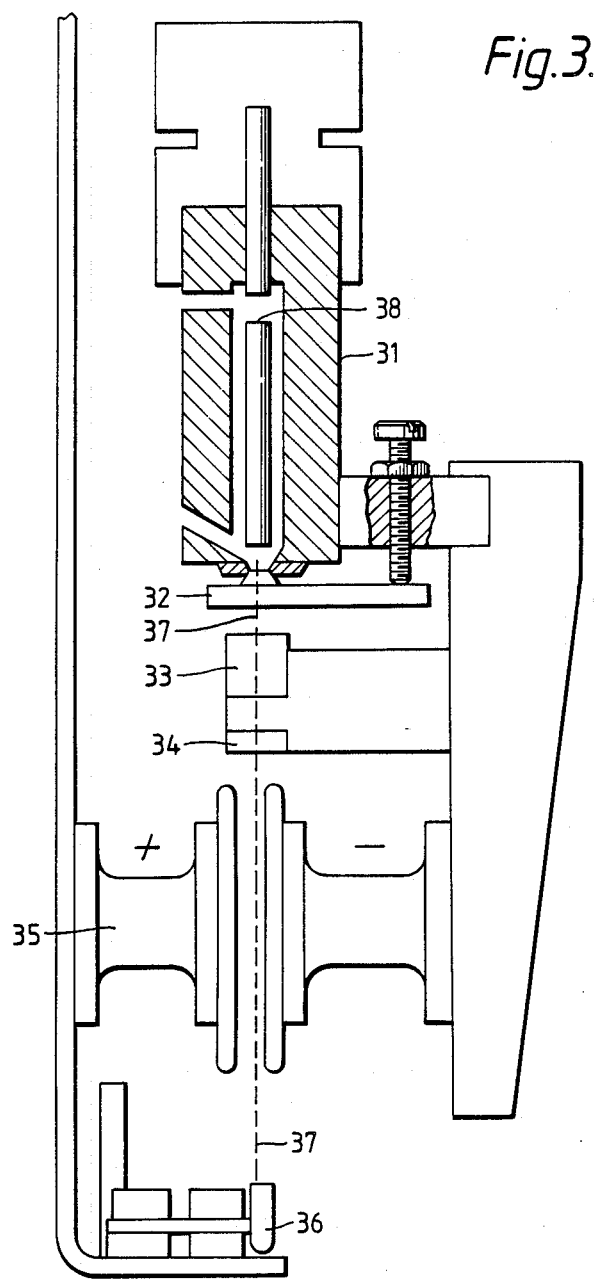
FIG. 3 illustrates the printing head assembly in the apparatus.

FIG. 2 shows the electronic control system in simplified block diagram form.

A micro-computer 200 with integral keyboard 201 is used to input messages to be printed and to provide diagnostic and servicing functions in use, through a print control section 202, which controls printing of ink through the print head 8. These print control functions form no part of the present invention and will not be further described herein. Print control and ink system control are all monitored/controlled through a monitor circuit board 203 to which signals from the print control 202, the temparature sensors 2,3, pressure sensors 5 (or 5′) and a front panel circuit board 204 are fed.

The pressure and temperature signals are passed to the monitor PCB 203 via an analogue interface 205. Similarly, the interface 205 also receives signals from a phase detector (not shown) which is conventional and which is located in the print head 8 to monitor charging of the droplets for printing. Again this forms no part of the present invention.

Control of the operation of the system by the monitor PCB 203 is further achieved through a driver PCB 206, which drives the stepper motor 12′ and various solenoids 13,15,17,24,27,28,29 under instruction of the monitor PCB which is programmed as required to carry out the desired functions.

An EAROM 207 which is attached to the ink tank 101 provides data to the monitor relating to the type of ink therein, as will be further described.

The front panel 204 includes various control switches 208,209,210, together with indicators and other items which are not relevant to a description of the present invention.

In use, firstly, a main "electronics on" switch 208 is actuated which switches power from an external power source to the system electronics. The system control carries out various initialization tasks, some of which are described in our copending application filed on even data herewith, but which form no part of the present invention.

The working principles of this type of machine are well known and will not be described in great detail. The print head 8 comprises a droplet generator 31 which incorporates a rod-like piezoelectric oscillator 38 and a nozzle plate 32 through which a continuous stream of ink 37 is emitted in use. Vibration of the rod within the droplet generator 31 causes the stream of ink to be broken up at some position downstream of the nozzle plate.

The stream of ink 37 is directed between the plates of a charging electrode 33 and then passes between the plates of a phase/charge detector 34 before passing between a pair of deflector plates 35, the charge between which is caused to deflect individual droplets in accordance with the degree of charge on them. Droplets which are not charged pass in a straight line into the droplet catcher or gutter 16.

In use uniform ink droplets are produced by oscillating the rod 38 for exmaple at a frequency of 64kHz and the print control 202 determines the charge to be applied to each droplet in order to cause it to be printed at the correct position after deflection by the plates 35. However, for proper charging to occur the charging signal must be synchronized with the instant of droplet generation and the droplet break-off point must occur inside the charging electrode 33.

If the break-off point is outside the charging electrode, below it, then the whole of the stream is continuously charged which would prevent printing. This predetermined level is that at which it is known by experiment that the break-up of the stream occurs below the charge detector. On the other hand, if the droplet break-off point is above the charging electrode then full charging of selected droplets will generally not be achieved as charging only takes place as a result of the charging field fringes.

In the prior art, in order to ensure that the break-off point was within the charging electrode, the amplitude of stimulation was varied whilst observing the stream of droplets through a microscope, the stimulation voltage amplitude thereafter being set when the break-off point was at the desired position.

The method of the invention achieves setting of the break-off point of the droplets automatically and is used so to set the break-off point each time the print head is made ready for printing.

The setting of the break-off point is carried out in two stages, in the first of which the ink temperature is first read, as described in our co-pending application filed on even date herewith, and a corresponding working pressure suitably set. As these steps form no part of the present invention they will not be further described.

Viscosity is chosen to be measured in this apparatus by means of a falling-ball viscometer 1 (as described in our EP-A No. 0142265, but, alternatively, viscosity could be determined as described in EP-A No. 0228828 (U.S. Ser. No. 940094), the details of both of which are herein incorporated by reference thereto. In either case, a relationship which is dependent upon the operating temperature of the ink yields a value of viscosity by means of which, as described in our earlier applications, decisions are taken as to adjustment of ink solvent in order to maintain the desired viscosity. This maintains the desired concentration of ink.

Figure 4:
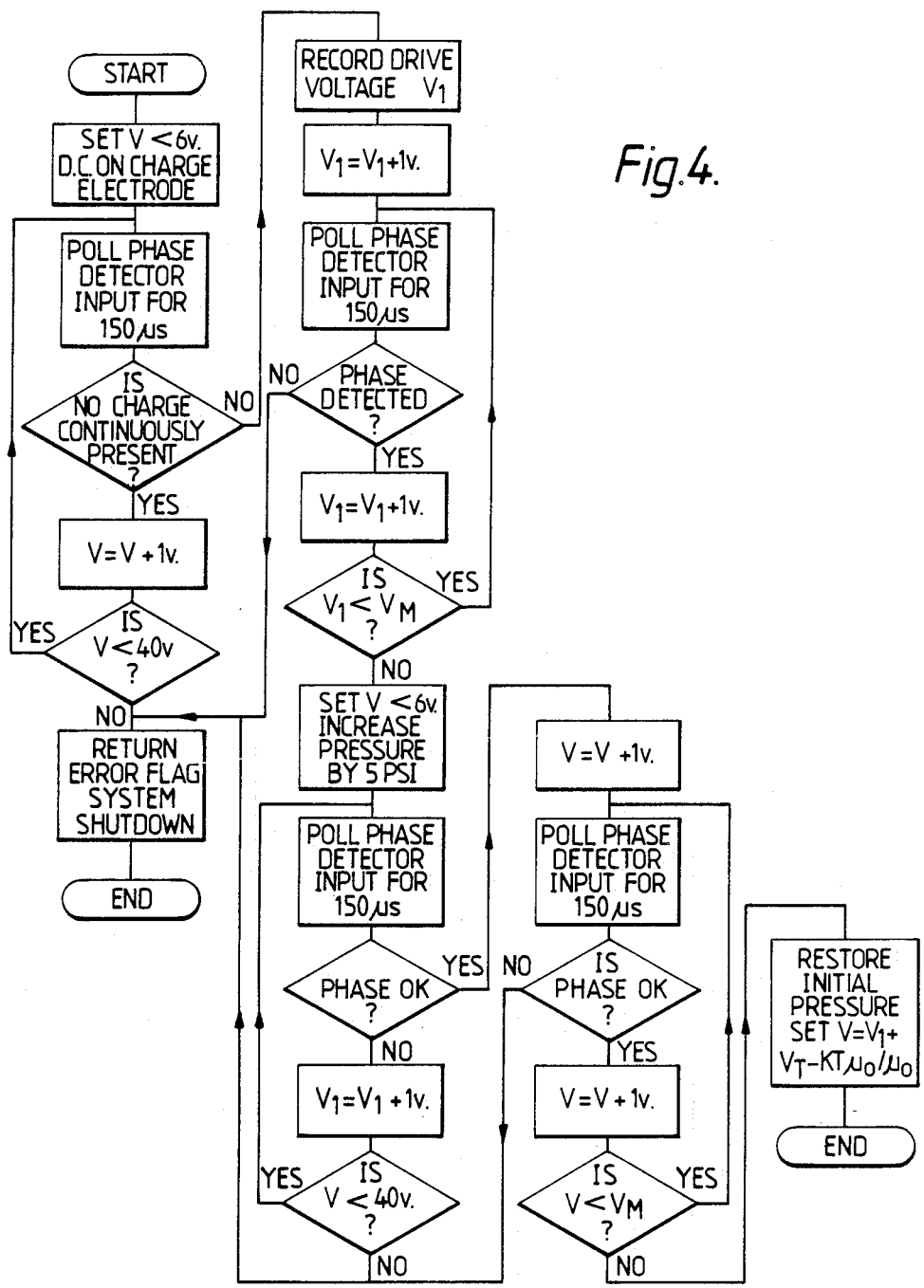
FIG. 4 is a flow chart illustrating the method in detail.

Next, the monitor PCB 203, under software control, carries out the routine shown in FIG. 4.

First it sets the amplitude of the stimulation voltage very low (less than 6 volts) which is low enough, due to the constant magnitude charging signal from the charging electrode 33 for the charge detected by the charge detector 34 to be continuously below a threshold value. This threshold value will be between 0.5 and 1 mV, depending on the length of the ink supply conduit from the system cabinet to the print head, and will be preset on installation for example. This indicates that the break-off point occurs below the charge detector 34. The amplitude is then increased in small steps (1 volt)

until intermittent and proper droplet charging, above the threshold value, is detected at which point the break-off point is just inside the bottom of the charging electrode. If 40 volts is reached before drops are detected then the test fails and the system shuts down (ie. all but the system electronics shuts off).

The amplitude of the stimulation voltage at this point is recorded as $V_1$ and is then incremented upto a value $V_M$ that is determined for a given machine by the following equation:

$$V_m = (V_{max} \text{ at } 45° C. + V_{max} \text{ at } 5° C.)/2 \pm KT$$

where the maximum and minimum operating temperatures are 45° C. and 5° C. respectively in this example and where:

K is a proportional, specific, constant having the units of volt/°C.

T is the actual operating temperature as measured by sensor 2.

To guard against the nozzle being blocked, the charging electrode being contaminated with ink or the driving element being inefficient, machine shutdown is caused to be effected whenever the stimulation amplitude required for the stream break-off point to be within the bottom of the charging electrode, exceeds 40 volts.

Again, to ensure that a proper print window exists, the amplitude of the stimulation voltage is incremented to $V_M$ volts (a value at which maximum power can be given to the ink stream before the break-off point comes out of the top of the charging electrode or before satellites are created disturbing the proper charging of the droplets) and a check is made by means of the charge detector 34 to ensure that proper drop charging is still being detected throughout this test. If it is not then the machine again is shut down as the print window would not be sufficiently wide to enable reliable printing to take place.

In the second stage of the method, which is designed to ensure that the pressure window is sufficiently wide, the system pressure is increased by, 5 psi, and the whole of the first stage of testing is carried out again. If all the tests are passed then the pressure is reduced to its previous value and the stimulation voltage V set to:

$$V = V_1 + V_T - KT.\mu^\circ/\mu c$$

where:

$V_1$ is the modulation voltage as determined above;

$\mu_o$ is theoretical ink viscosity at current ink temperature;

$\mu_c$ is current ink viscosity;

$V_T = [9(V_{min} + V_{max} \text{ at } 5°C) - (V_{min} + V_{max} \text{ at } 45° C.)]/16$ and Vmin=is the voltage which, if reached without charge being detected, the test is made to fail; $V_{max}$ is the voltage which must be reached in the test, starting from the voltage at which droplets were first detected, with charge always being present; ($V_{min}$ and $V_{max}$ are temperature dependent and are calculated and preset for a given machine during installation).

The minimum voltage level set for the bottom of the stimulation voltage window is experimentally determined and provides an indication of the minimum power necessary for the break-off point to be just at the bottom of the charging electrode. If the minimum voltage necessary for this exceeds 40 volts then it has been found empirically that either the driver is inefficient, too much ultrasonic energy is being damped, the nozzle is partially or completely blocked, or that the ink system pressure is too high or too low.

The voltage values given in this example are specific to the machine and will vary from machine to machine in practice.

The break-off position in use is dependent on the pressure of ink in the feed line to the print head and the pressure is dependent in turn on the viscosity which may change with changing ink temperature. However, these factors are also critical in determining the velocity of the ink stream and thus changes in temperature can be compensated for by a velocity control method such as described in our co-pending application filed on even date herewith.

We claim:

1. A method of operating a continuous ink jet printing system which includes a nozzle; a piezoelectric oscillator arranged to vibrate the nozzle and driven by a stimulation voltage; a charging electrode, said nozzle, in use, passing a stream of ink under pressure past said charging electrode; and a charge detector disposed immediately downstream of said charging electrode, said method comprising :
    sensing the continuity of charge detection by means of said charge detector; and the steps of:
    (a) firstly, setting the amplitude of said stimulation voltage applied to the piezoelectric oscillator sufficiently low that the level of charge detected by said charge detector is below a predetermined threshold value;
    (b) secondly, increasing the amplitude of said stimulation voltage in discrete steps until said charge detector detects intermittent and proper droplet charging; and,
    (c) thereafter increasing the amplitude of said stimulation voltage from its level at the end of the step (b) by a predetermined amount.

2. A method according to claim 1, wherein, to guard against blockage of the nozzle, contamination of the charging electrode with ink or inefficiency of the oscillator, machine shutdown is effected whenever the minimum stimulation voltage necessary for taking the stream break-off point into said charging electrode exceeds a second predetermined value.

3. A method according to claim 1, wherein, to ensure that a proper print window exists, said stimulation voltage amplitude is increased up to a third predetermined or maximum level and said charge detector is monitored to determine whether or not proper droplet charging is being detected throughout said increase.

4. A method according to claim 1, wherein said ink pressure is increased by a predetermined amount and said method repeated, and thereafter reducing said pressure to its original value and setting said stimulation amplitude to the value as determined in said step (c).

* * * * *